Patented Oct. 28, 1947

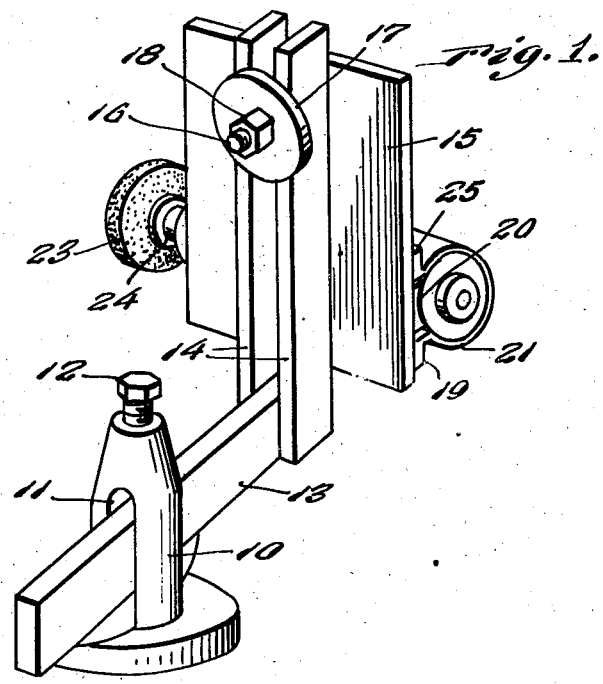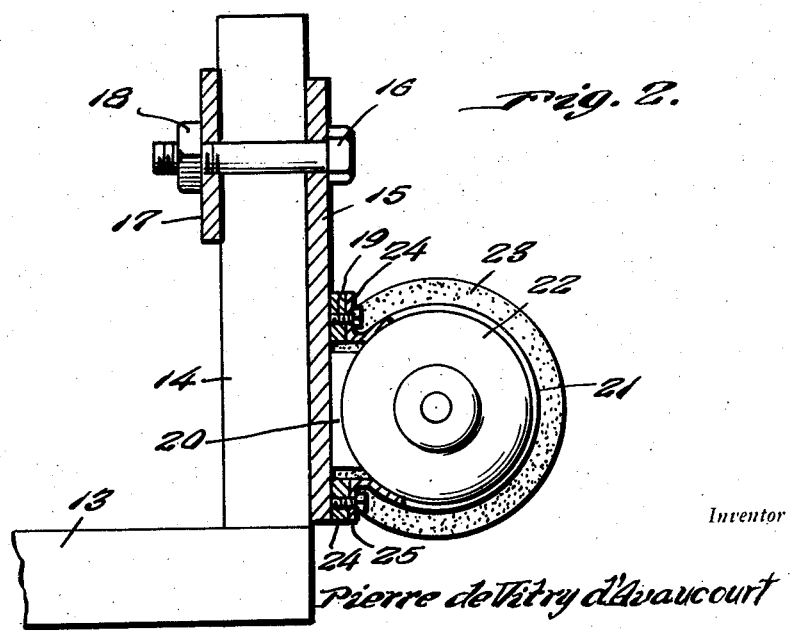

2,429,710

UNITED STATES PATENT OFFICE 2,429,710

ATTACHMENT FOR LATHES

Pierre de Vitry d'Avaucourt, Bainbridge, Pa., assignor of one-half to William Boston Bailey, Huntington, W. Va.

Application October 23, 1944, Serial No. 559,973

7 Claims. (Cl. 51—259)

This invention relates to an attachment for lathes or the like, and more particularly to such an attachment adapted to hold a grinder or the like in association with a lathe.

A primary object of this invention is the provision of an attachment for lathes, planers, shapers, milling machines or the like, whereby a hand electric grinder of any desired type may be secured to a lathe to transform the device into an external or internal grinding machine.

An additional object of this invention is the provision of such a device whereby the grinder may be positioned at any desired angle with relation to the work.

Still another object is the provision of such an attachment whereby the relative height of the grinder with respect to the work may be varied at will.

Still another object of the invention is the provision of such an attachment which will be sturdy and durable in construction, reliable and efficient in operation, and relatively simple and inexpensive to manufacture and attach.

Other objects reside in the combinations of elements, arrangements of parts and features of construction, all as will be more fully pointed out hereinafter and disclosed in the accompanying drawing, wherein there is shown a preferred embodiment of this inventive concept.

In the drawing:

Figure 1 is a perspective elevational view of one form of device embodying this invention, and Figure 2 is an enlarged central vertical sectional elevational view of the device.

Like reference numerals refer to like parts throughout the several views of the drawing.

Having reference now to the drawing, there is shown at 10 a tool-holding post adapted to be mounted in the conventional location on a lathe or the like, provided with the customary toolholding slot 11 and set screw 12. Adapted to be seated in the slot 11 is a transverse supporting bar 13, to the extremities of which are suitably attached, as by welding or the like, two spaced parallel vertically extending guide members 14 forming a slotted vertical guide member.

A plate 15, preferably of rectangular configuration, is adapted to be mounted on the front face of the guide members 14, and secured in position, as by clamping means shown as a bolt 16, passed through a suitable aperture in the plate, and extending between the guide members 14, and having positioned on its inner extremity a washer 17 and a nut 18.

Mounted on the front face of plate 15 adjacent the base thereof is a supporting member 19 provided with an arcuate concaved surface 20 and having secured thereto a sleeve 21. Adapted to be positioned within sleeve 21 is a hand grinder of any desired conventional type, comprised of a cylindrical electric motor casing 22 and a grinding wheel 23 supported on a rotatable drive shaft 24 of the motor. The sleeve 21 is of a diameter adapted to surround the cylindrical casing 22 of the grinder tightly, and the grinder may be secured in position therein, as by means of set screws 25 passed through suitable apertures in flanges 26 formed at the edge of sleeve 21 and secured to the member 19.

From the foregoing the operation of the device should be readily understandable. When it is desired to convert a lathe into a grinding tool, the attachment is secured in the tool post by positioning the arm 13 in the slot 11, securing the same position as by set screw 12, and the device adjusted to the desired horizontal angle by adjustment of the tool post in a conventional manner. The grinder is then positioned in the sleeve 21, and adjusted to a desired vertical angle by suitably positioning the plate 15 at the requisite angle with respect to guide members 14, whereupon the nut 18 is tightened on the bolt 16, and the device is securely held in the desired position. Power is supplied to the grinder in any desired conventional manner, and the device is suitably positioned to engage the work.

From the foregoing it will now be seen that there is herein provided an attachment for lathes accomplishing all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In an attachment for lathes, in combination, an arm, spaced guide members secured to one extremity of said arm, a plate, a bolt passed through said plate between said guide members, a washer and nut on the inner extremity of said bolt, and a grinder removably secured to the outer face of said plate.

2. In an attachment for lathes, in combination, an arm, spaced guide members secured to one extremity of said arm, a plate, a bolt passed through said plate between said guide members, a washer and a nut on the inner extremity of said bolt, a sleeve on the outer face of said plate, and a grinder removably secured in said sleeve.

3. In an attachment for lathes, in combination, a horizontal arm adapted to be secured in the tool post of said lathe, a vertical guide secured at one extremity of the arm at right angles thereto and having a vertical slot, a vertical plate, horizontal clamping means extending through the plate and slot of the guide securing the plate to and against said guide at right angles to said arm for vertical adjustment in the slot and angular adjustment in a vertical plane on the clamping means as a horizontal axis in said slot, a sleeve on the outer face of said plate, an electric motor having a drive shaft removably secured in said sleeve, and a grinder wheel directly secured to said drive shaft.

4. In an attachment for lathes, in combination, an arm adapted to be secured in the tool post of said lathe, a vertical guide member secured to the inner end of the arm and having a vertical slot therethrough, a vertical plate, a clamping member extending horizontally through the plate and slot and securing said plate against said guide member and through said slot at right angles to said arm for vertical adjustment in the slot and angular adjustment on a horizontal axis formed by the clamping member between the inner face of the guide member and the outer face of the plate, a sleeve on the outer face of said plate in a horizontal position, an electric motor having a drive shaft removably secured in said sleeve, a grinder directly secured to said drive shaft.

5. In an attachment for lathes, in combination, an arm adapted to be secured in the tool post of said lathe, vertical guide members secured to the extremity of the arm remote from the post and forming a vertical guide slot, said guide members extending upwardly at right angles to the arm, a vertical plate disposed against the guide members, a sleeve on the outer face of said plate, an electric motor having a drive shaft and removably secured to said sleeve, a grinder disk directly secured to said drive shaft, and means for varying the position of said plate with respect to said arm, said last-mentioned means including a clamping bolt extending through the upper portion of the plate and through the slot of the guide members, a washer on the bolt spanning said guide members and clamped thereto for clamping the plate, motor and grinder disk in vertically adjusted position, as well as at any desired angle in a vertical plane with relation to the work on said securing and clamping bolt as a horizontal axis.

6. In an attachment for lathes, an arm adapted to be secured in a tool post, a vertically slotted guide support member secured to one extremity of said arm, a vertical plate disposed against the front of the guide member, means passed through the plate and slot of the guide support member to engage the inner face thereof for adjusting the plate up or down in the slot in a vertical plane, or angularly in a vertical plane on said clamping means while remaining in contact with the front of the guide member and a grinder removably secured to the outer face of said plate.

7. In an attachment for lathes, an arm adapted to be secured to the tool post of said lathe, a vertical guide member forming a vertical slot, secured to the extremity of the arm remote from the post and extending upwardly at right angles thereto, a vertical plate disposed against the guide member, and means for varying the position of said plate with respect to said arm, including a clamping member extending through the plate and through the slot of the guide member and on which the plate is angularly adjustable in a vertical plane on the clamping member as a horizontal axis, and having means spanning the slot of the guide member to clamp the plate thereto for vertical adjustment in the slot against the guide member.

PIERRE DE VITRY D'AVAUCOURT.

REFERENCES CITED

The following references are of record in the file of this patent:

UNITED STATES PATENTS

| Number | Name | Date |
|---|---|---|
| 1,391,039 | Beach | Sept. 20, 1921 |
| 1,259,131 | Ritz | Mar. 12, 1918 |
| 1,355,710 | Stryhal | Oct. 12, 1920 |
| 1,501,681 | Nielsen | July 15, 1924 |

FOREIGN PATENTS

| Number | Country | Date |
|---|---|---|
| 483,529 | France | Apr. 23, 1917 |